Sept. 21, 1948.　　　F. W. EDWARDS　　　2,449,888
COMPRESSOR DRIVE CONTROL
Filed Sept. 11, 1944
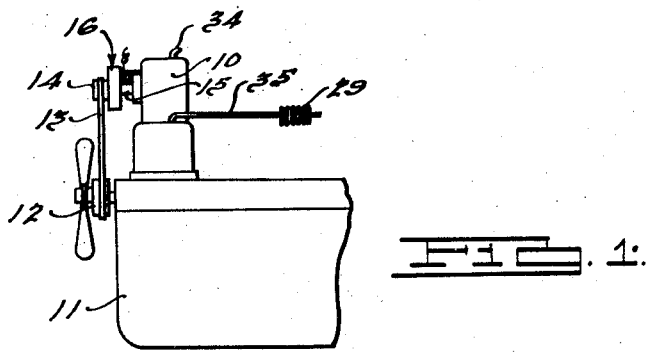
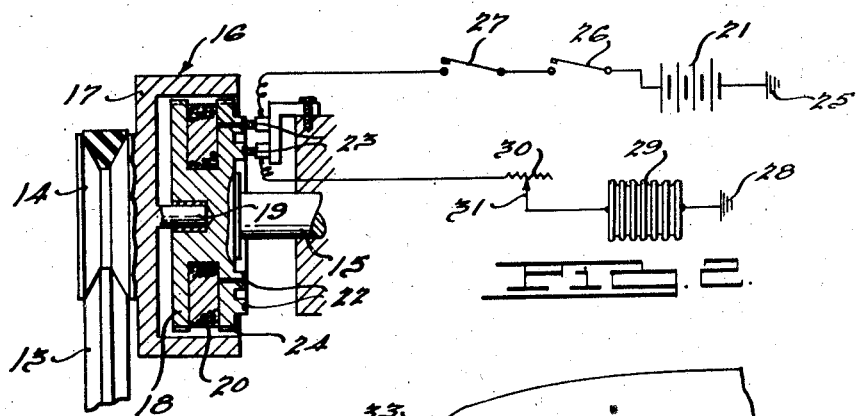
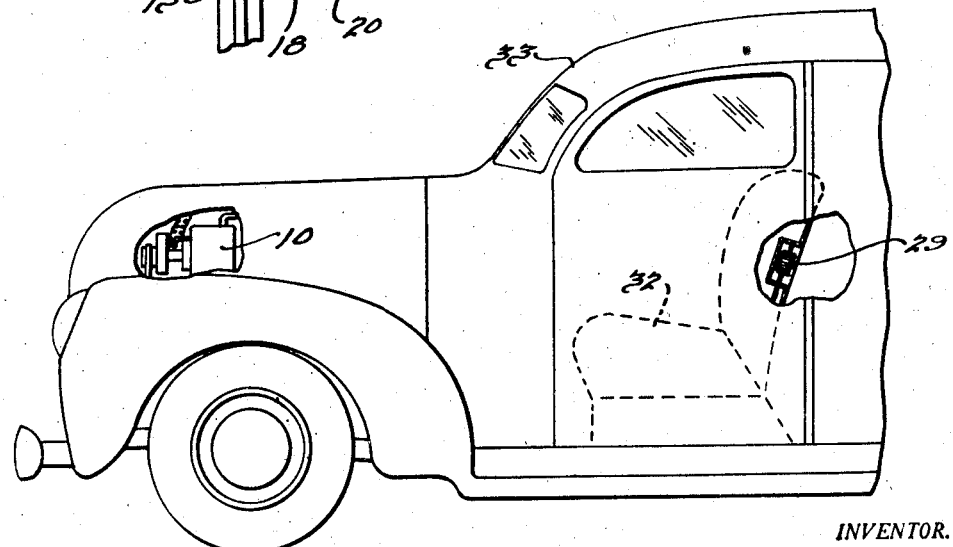
INVENTOR.
Franklin W. Edwards.
BY
Harness & Harris
ATTORNEYS.

Patented Sept. 21, 1948

2,449,888

UNITED STATES PATENT OFFICE 2,449,888

COMPRESSOR DRIVE CONTROL

Franklin W. Edwards, Detroit, Mich., assignor to Chrysler Corporation, Highland Park, Mich., a corporation of Delaware Application September 11, 1944, Serial No. 553,526

3 Claims. (Cl. 62—2)

This invention relates to controls for compressors and the like. More particularly, it relates to compressor drives and means for controlling the compressor speed by controlling the slip of the coupling between the compressor and its driving source.

Specifically, my invention is concerned with refrigerating compressors for passenger car air conditioning installations, but it is desired to emphasize that the invention is by no means limited to such an arrangement. My improved compressor drive and control means is equally useful and advantageous in the driving of compressors on trucks for refrigerating perishables and the like; on railroad car installations, and in stationary refrigerating or air conditioning systems.

The apparatus and arrangement disclosed and claimed herein is particularly advantageous when used in connection with the sealed compressor shown and claimed in my co-pending application, Serial No. 547,480, filed July 31, 1944.

Generally speaking, my invention comprises an improved means for driving a refrigerating compressor which includes an eddy-current coupling and automatic means for controlling the slip of the coupling thereby to control the compressor output.

In the drawings which accompany this description,

Fig. 1 is a partial elevation of an engine having a compressor mounted thereon.

Fig. 2 is a schematic layout of the eddy-current coupling and wiring thereof, and Fig. 3 is a partial elevation of a motor vehicle with parts broken away to illustrate details of the compressor control.

In the drawings, 10 indicates a refrigerating compressor of commercial type which is mounted on an internal combustion engine 11 and driven from the fan pulley 12 by means of a belt 13. Between the compressor pulley 14 and the shaft 15 is an eddy-current coupling 16.

The eddy-current coupling may be of any satisfactory design, but preferably comprises a driving member 17 on which is integrally formed the pulley 14, and a driven member 18 which is carried by the compressor drive shaft 15. The driving member 17 has an integral axial stub shaft 19 which is piloted into the driven member as shown, suitable bearing means being provided to permit relative rotation between the members 17 and 18.

The driven member 18 carries a field coil 20 which is supplied from a battery 21 through a pair of slip rings 22 and brushes 23. The rings 22 are connected with the field coil 20 by leads 22' as illustrated. The driven member 18 is provided with inner peripheral teeth 24 which serve to shorten the air gap between the members 17 and 18 at certain points. The members 17 and 18 are preferably made of high-permeability iron or steel. When the coil 20 is energized, it generates a flux which travels around the coil in a circular path which includes the annular portion of the driving member 17 that is radially adjacent the teeth 24.

Rotation of the member 17 causes a selected point on the member to move through alternate regions of high and low flux density because of the variable air gap formed by the teeth 24. The flux flowing through said point therefore, varies in magnitude and eddy-currents are induced. These eddy-currents produce an opposing flux which, in accordance with Lenz's law, tends to oppose relative rotation between members 17 and 18.

The member 18 will therefore be dragged along with the member 17 and will tend to approach it in speed. Because of inherent losses, the member 18 will never quite catch up in speed with the member 17. In other words, there always will be "slip" between the coupling members.

By proper design of the members and by controlling the excitation of the field coil 20, the slip may be varied as desired. In the present instance, the compressor 10 is driven by a variable speed engine 11 and it is desirable to control the compressor speed in accordance with the load thereon.

Referring to Figs. 1 and 2, the battery 21 is grounded at 25 and is connected to the field coil through a pair of switches. The switch 26 is preferably, but not necessarily included, and is the regular vehicle ignition switch. The switch 27 is the cooling control switch and is turned "on" only when cooling is desired. The other side of coil 20 is connected to ground at 28 through a temperature sensitive device 29 and a variable resistor 30. The latter has an arm 31 which is connected to the temperature sensitive device 29 and is moved by it in accordance with changes in temperature as will be understood. The device 29 may be of any suitable design, such as a bi-metallic thermostat or the like. For convenience it is shown as a bellows type of thermostat.

The device 29 may be positioned in the cooled space where it is subject to variations in temperature. Fig. 3 shows it installed in the back cushion of a seat 32 of a passenger body 33. When the cooling switch 27 is "on," a rise in the temperature inside the body 33 will cause the device 29 to reduce the resistance 30, thereby increasing the excitation of the coil 20. This decreases the slip in the coupling 16 and increases the speed of the compressor 10 and consequently the cooling. A rise in temperature in the body will effect a decrease in cooling in a simple manner.

It will be understood that the device 29 may be installed in any cooled space such as a truck or trailer body, a railroad car, etc. In the case of stationary installations, the device would be installed in the room or cabinet to be cooled.

Referring back to Fig. 1, it may be seen that the compressor 10 has an outlet or high pressure pipe 34 and an inlet or low pressure pipe 35. The temperature sensitive device 29 may be installed in (or attached to) the low pressure pipe 35 as illustrated. In such a location it is sensitive to load (the temperature of the returning refrigerant) and will regulate the compressor without the necessity of long wiring.

The specific location of the device 29 is necessarily dictated by the requirements of the individual application.

In stationary installations, the driving motor or engine will usually be of the constant speed type so that the device 29 will be required to regulate the coupling slip in accordance with load requirements only. In vehicle installations, a variable speed driving source is usual, and in such cases, the device 29 performs a dual function. It regulates the slip of the coupling and consequently the compressor output in response to variations in temperature of the cooled space caused by outside temperature variation and by speed variation of the driving source as well.

It can therefore be seen that my improved compressor control is particularly suitable in vehicle installations.

While I have shown but two examples of my invention, it will be understood that such is for the purpose of illustration only and the invention in its broader aspects is not intended to be limited except as defined in the appended claims.

I claim:

1. In a motor vehicle having an engine, an engine compartment and a passenger compartment, a refrigerant compressor located in said engine compartment, a magnetic coupling adapted to transmit drive from said engine to said compressor and control means for said coupling comprising a source of electrical energy and a circuit for said energy to said coupling, said circuit including a variable resistance and a temperature responsive device adapted to vary said resistance, said device being located in said passenger compartment to thereby control the drive of said compressor in response to the temperature of said passenger compartment.

2. In a motor vehicle having an engine, a refrigerant compressor, a magnetic coupling adapted to transmit drive from said engine to said compressor and control means for said coupling comprising a source of electrical energy and a circuit for said energy to said coupling, said circuit including a variable resistance and a temperature responsive device adapted to vary said resistance in response to changes in the temperature of refrigerant entering said compressor.

3. In a motor vehicle having an engine, a refrigerant compressor, a magnetic coupling adapted to transmit drive from said engine to said compressor and control means for said coupling comprising a source of electrical energy and a circuit for said energy to said coupling, said circuit including a variable resistance and a temperature responsive device adapted to vary said resistance.

FRANKLIN W. EDWARDS.

REFERENCES CITED

The following references are of record in the file of this patent:

UNITED STATES PATENTS

| Number | Name | Date |
|---|---|---|
| 643,413 | Kennedy | Feb. 13, 1900 |
| 704,574 | Pintsch | July 15, 1902 |
| 1,359,616 | Murray | Nov. 23, 1920 |
| 1,820,035 | Stokes | Aug. 25, 1931 |
| 1,833,987 | Chryst | Dec. 1, 1931 |
| 2,090,401 | Mayo | Aug. 17, 1937 |
| 2,187,569 | Henney | Jan. 16, 1940 |
| 2,193,836 | Winther et al. | Mar. 19, 1940 |
| 2,193,837 | Winther et al. | Mar. 19, 1940 |
| 2,286,778 | Winther | June 16, 1942 |
| 2,292,349 | Bennett | Aug. 11, 1942 |
| 2,320,432 | Henney | June 1, 1943 |
| 2,396,000 | Findly | Mar. 5, 1946 |